L. L. PARTAIN.
AUTOMOBILE DIRIGIBLE HEADLIGHT.
APPLICATION FILED OCT. 27, 1917.
1,314,537.
Patented Sept. 2, 1919.
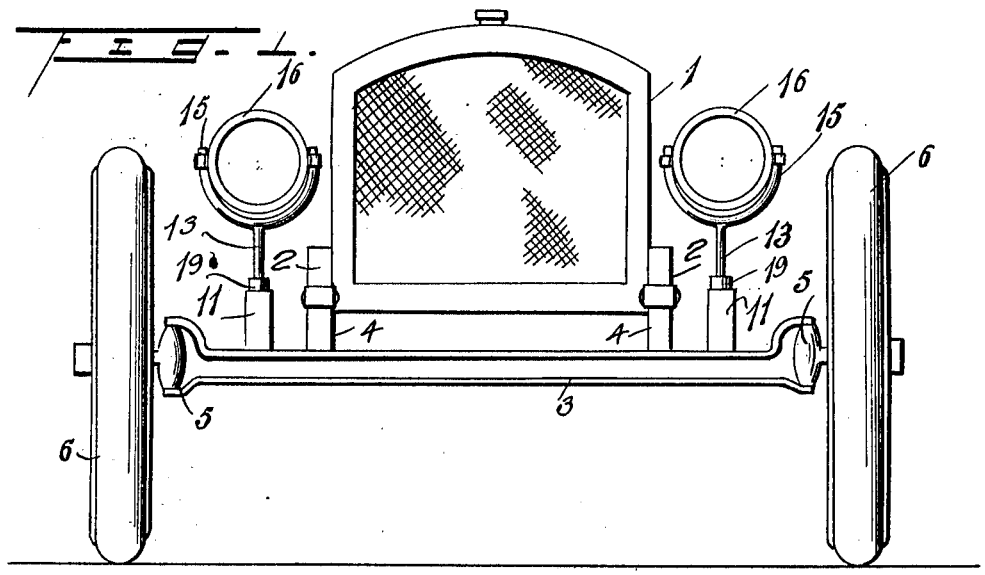
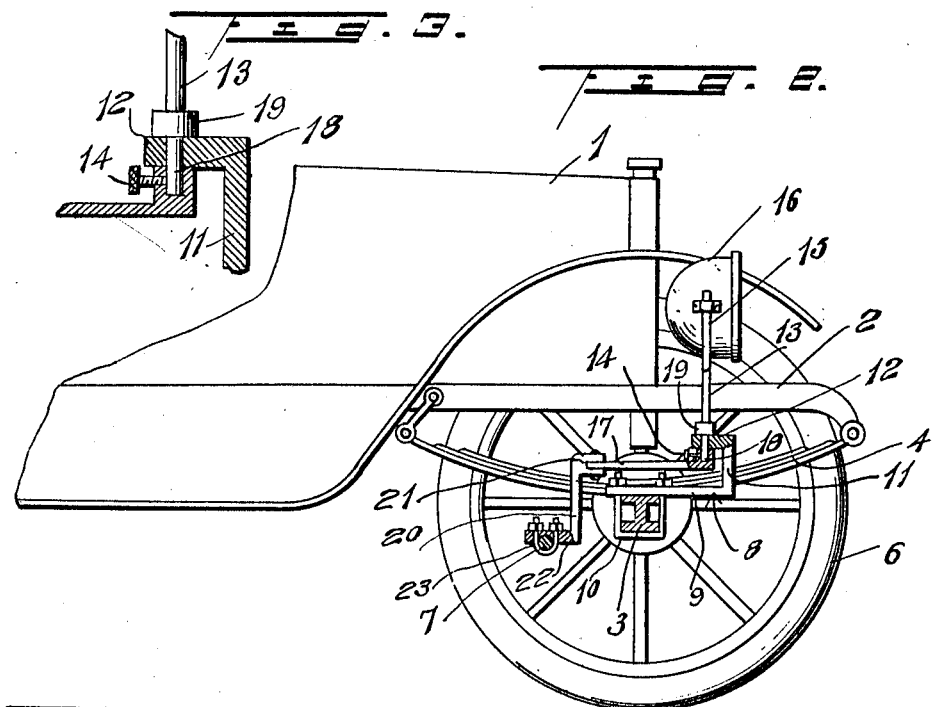
Witnesses
E. A. R. Stanton.
Wm. F. Davidson
Inventor
L. L. Partain.
By
Attorney

UNITED STATES PATENT OFFICE.

LUCIUS L. PARTAIN, OF SPARKS, GEORGIA.

AUTOMOBILE DIRIGIBLE HEADLIGHT.

1,314,537. Specification of Letters Patent. Patented Sept. 2, 1919.

Application filed October 27, 1917. Serial No. 198,855.

*To all whom it may concern:*

Be it known that I, LUCIUS L. PARTAIN, a citizen of the United States, residing at Sparks, in the county of Berrien and State of Georgia, have invented certain new and useful Improvements in Automobile Dirigible Headlights; and I do hereby declare the following to be a full, clear, and exact description of the invention, such as will enable others skilled in the art to which it appertains to make and use the same.

This invention relates to improvements in automobile dirigible headlights and has for one of its objects, the provision of a device of this character whereby the headlights will be compelled to move automatically with the turning of the front wheels of the automobile so that the roadway on which the automobile is traveling will be illuminated at all times.

Another object of this invention is the provision of lamp standards carrying headlights journaled to the automobile and so connected to the steering mechanism that when the steering mechanism is moved or turned to turn the front wheels they will be compelled to move in a corresponding direction.

A further object of this invention is the provision of an automobile dirigible headlight of the above stated character which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

Figure 1 is a front elevation of an automobile dirigible headlight constructed in accordance with my invention, Fig. 2 is a fragmentary longitudinal sectional view of the same, and Fig. 3 is a detail sectional view illustrating the connection between an operating arm and the lamp standards.

Referring in detail to the drawing, the numeral 1 indicates the body of an automobile mounted upon a chassis 2 which is supported upon an axle 3 by means of springs 4. The axle 3 is of the ordinary type employing the steering knuckles 5 on which are journaled the front wheels 6. The steering knuckles 5 are connected in the usual manner by a connecting rod 7 that is operatively connected with the steering mechanism of the automobile (not shown). The foregoing description relates to a well known construction of automobile and to which my invention is applied.

Supporting brackets 8 consisting of horizontal plates 9 are positioned upon the axle 3 and secured thereto by suitable clamps 10. The horizontal plates 9 extend forwardly of the axle and have formed thereon vertically disposed members 11. The vertically disposed members 11 have formed thereon bearings 12 to receive the lower ends of lamp standards 13. The lamp standards 13 have formed thereon collars 14 which ride upon the bearings 12 to limit the downward movement of the lamp standards therein. The upper ends of the lamp standards are bifurcated to form spaced arms 15 to which are secured the headlights 16.

Rearwardly extending arms 17 have formed upon their forward ends vertically disposed socketed members 18 which receive the lower ends of the lamp standards 13 and are secured thereto by set screws 19. The arms 17 extend rearwardly from the lamp standards over the axle 3 and are pivoted to connecting members 20 as illustrated at 21. The connecting members 20 extend downwardly and rearwardly to form horizontal portions 22 which are recessed to receive the connecting rod 7. The connecting rod 7 is secured to the horizontal portions 22 by means of clamps 23 whereby upon moving the connecting rod 7 by the ordinary steering mechanism laterally to turn the front wheels, the headlights 16 are compelled to turn in a corresponding direction, thus illuminating the roadway at all times.

While I have shown and described the preferred embodiment of my invention, it will be understood that minor changes in construction, combination and arrangement of parts may be made without departing from the spirit and scope of the invention as claimed.

Having thus described my invention, what I claim is:—

A dirigible headlight comprising a horizontal plate secured to the top face of the axle of an automobile and projecting forwardly thereof, a vertically disposed member formed on the forward end of said plate, a horizontal and rearwardly extending bearing formed on the upper end of said member, a lamp standard journaled in said bearing and having its lower end terminating between said bearing and the plate, a lamp secured to the standard, and means extending rearwardly over said plate for connecting the lamp standard to the steering mechanism of the automobile.

In testimony whereof I affix my signature in presence of two witnesses.

LUCIUS L. PARTAIN.

Witnesses:
J. B. BROGDON,
JNO. F. PARRISH.

Copies of this patent may be obtained for five cents each, by addressing the "Commissioner of Patents, Washington, D. C."